(12) United States Patent
Hoover et al.

(10) Patent No.: US 7,415,284 B2
(45) Date of Patent: Aug. 19, 2008

(54) METHODS OF TRANSMITTING A MESSAGE TO A MESSAGE SERVER IN A PUSH-TO-TALK NETWORK

(75) Inventors: Christopher Hoover, San Francisco, CA (US); Mohsen Emami-Nouri, San Francisco, CA (US)

(73) Assignee: Sonim Technologies, Inc., San Mateo, CA (US)

( * ) Notice: Subject to any disclaimer, the term of this patent is extended or adjusted under 35 U.S.C. 154(b) by 551 days.

(21) Appl. No.: 10/932,665

(22) Filed: Sep. 2, 2004

(65) Prior Publication Data

US 2006/0046757 A1    Mar. 2, 2006

(51) Int. Cl.
*H04B 7/00* (2006.01)

(52) U.S. Cl. ............... 455/518; 455/90.2; 455/519; 455/520; 455/412.1; 455/414.1

(58) Field of Classification Search ......... 455/416–520, 455/90.2, 412.1, 414.1; 370/352, 389, 338, 370/328, 353, 276; 709/233
See application file for complete search history.

(56) References Cited

U.S. PATENT DOCUMENTS

| | | | | |
|---|---|---|---|---|
| 7,116,995 | B2 * | 10/2006 | Savinen et al. | 455/466 |
| 7,181,538 | B2 * | 2/2007 | Tam et al. | 709/246 |
| 2004/0192364 | A1 * | 9/2004 | Ranalli et al. | 455/517 |
| 2004/0224710 | A1 * | 11/2004 | Koskelainen et al. | 455/518 |
| 2004/0249949 | A1 * | 12/2004 | Gourraud et al. | 709/227 |
| 2004/0253961 | A1 * | 12/2004 | Kong et al. | 455/450 |
| 2005/0032539 | A1 * | 2/2005 | Noel et al. | 455/518 |
| 2005/0048998 | A1 * | 3/2005 | Zhu | 455/550.1 |
| 2005/0135374 | A1 * | 6/2005 | Isomaki et al. | 370/395.2 |
| 2005/0180394 | A1 * | 8/2005 | Kautz et al. | 370/352 |
| 2005/0202806 | A1 * | 9/2005 | Bourgeois et al. | 455/416 |
| 2005/0213518 | A1 * | 9/2005 | Ahya et al. | 370/276 |
| 2005/0245236 | A1 * | 11/2005 | Servi et al. | 455/411 |
| 2005/0288041 | A1 * | 12/2005 | Gill et al. | 455/458 |
| 2006/0030344 | A1 * | 2/2006 | Lim | 455/512 |
| 2006/0056361 | A1 * | 3/2006 | Jiang et al. | 370/335 |

* cited by examiner

*Primary Examiner*—Matthew Anderson
*Assistant Examiner*—Dominic E Rego
(74) *Attorney, Agent, or Firm*—Kali Law Group, P.C.

(57) ABSTRACT

In a push-to-talk communications network, a method of transmitting a message from a sending device to a set of receiving devices is disclosed. The method includes selecting the set of receiving devices from a contact list on the sending device, such that each of the receiving devices has an address on the contact list. The method also includes transmitting the message to a message server, wherein the sending device is coupled to the message server; storing the message within the message server; and assigning the message an identifier. The method further includes notifying the set of receiving devices that the message can be retrieved, wherein each of the set of receiving devices is coupled to the message server. Advantages of the invention include a standards-based solution that combines the flexibility of mobile messaging with the ease-of-use of voice.

87 Claims, 11 Drawing Sheets

METHODS OF TRANSMITTING A MESSAGE TO A MESSAGE SERVER IN A PUSH-TO-TALK NETWORK

BACKGROUND

The present invention relates in general to cellular communication technologies and in particular to methods of transmitting a message to a message server in a push-to-talk network.

Mobile cellular communication is evolving beyond traditional voice telephony towards more sophisticated services, such as Push-To-Talk (PTT). Similar to conventional walkie-talkie communication, PTT enables mobile communication users to send a voice message to one or more recipients over a mobile phone by simply pushing a key (i.e., PTT button, etc.).

One particular version of PTT, called PoC (PTT-over-Cellular), has started to be implemented in wireless data networks such as GSM/GPRS and CDMA cellular networks. By using internet protocols (i.e., an internet protocol network), these networks can provide a packet-based data service that enables information to be sent and received across a mobile telephone network. In addition, the use of internet protocols also facilitates PoC through the use of instant connections. That is, information can be sent or received immediately as the need arises, subject to available time slots at the air interface.

PTT, including PoC-based PTT, is also half-duplex. That is, all participants typically use a single frequency or channel for both transmission and reception. Either a participant speaks or listens, but not both. This is in contrast to traditional cellular communication that is full-duplex (e.g., like a regular wired phone), in which at least one channel or frequency is assigned to talk, and another separate one is assigned to listen such that both speaking and listening can occur simultaneously.

Many PTT implementations, including the PoC based PTT implementation, also provide contact list functionality. A contact list typically contains the identifiers of other users or groups such that an end user may initiate a PTT call by selecting one or more entries from the list. An entry in a contact list is a contact, e.g. the identity of a user, or a group, which is representative of multiple users. Within PoC, a contact list contains either users or groups, but not both. Generally, a contact is uniquely identified via a SIP URI (Session Initiation Protocol Universal Resource Identifier).

The PTT operator (i.e., Cingular, ATT, etc.) generally assigns to each user, an address-of-record (also known as public user identity) in the form of a SIP URI comprising a user name portion and a domain portion. In general, the username portion of the SIP URI uniquely identifies the user within a given namespace or network. Likewise, the domain part of the SIP URI uniquely identifies a domain owned by the operator. For example, "sip:joe.doe@operator.net" in which "joe.doe" is the username portion of the SIP URI and "operator.net" is the domain portion of the SIP URI. Additional information may also be associated with a contact to facilitate interaction with the contact list; for example, a display name.

PoC is discussed in greater detail in the following technical specifications which are incorporated by reference: *Push-to-talk over Cellular (PoC); Architecture; PoC Release* 2.0, *V*2.0.8 (2004-06) and *Push-to-talk over Cellular (PoC); Signaling Flows—UE to Network Interface (UNI); PoC Release* 2.0, *V*2.0.6 (2004-06) as well as *Push-to-talk over Cellular (PoC) User Plane; Transport Protocols, PoC Release* 2.0, *V*2.0.8 (2004-06). It should also be mentioned that a Release 1.0 is also available from the PoC Consortium as well as an upcoming PoC standard from Open Mobile Alliance (OMA). All of these are generally considered native PoC standards. Subsequently, a UE (user equipment) supporting either of these standards is called a native PoC client (or non-DVM client).

Referring now to FIG. 1, a simplified diagram of a PTT architecture is shown. In general, access in the PTT architecture may include both the radio access as well as other IP-enabled transport mechanisms (e.g. a PTT application client be hosted on an Internet-enabled PC). UE 102 generally refers to the device containing the PTT application client software, such as a cellular phone. Within the PoC architecture, UE 102 uses SIP to establish, modify and terminate multimedia sessions or calls with other PoC enabled clients. A session is considered an exchange of data between associations of participants. SIP supports session control, and may support user location, user capability, call setup, and call handling. In addition, since SIP is a generic session protocol, services other than voice can be chosen such as video transfer, multi-media messaging, multiparty gaming, etc.

Generally, an XML based extension associated with SIP messages, called SDP, is used to negotiate the appropriate level and type of service (i.e., available codecs, buffer sizes, etc.), as well as establish a transport path from UE 102 to PoC Server 110. The term early session refers to a session that is already available for quick connection establishment, prior to the PTT transmission (i.e., pre-established). The term on demand session generally refers to a session that is established as part of the PTT transmission. The type of session is normally configured by the operator as a service option choice. Early sessions connect faster but require more network resources.

Once the session is established, RTP (real time transmission protocol) is used for the transmission of data packets within a session. Because the PTT system is half-duplex, it is important to manage which participant within a session is permitted to speak (given that only one participant may speak at once). RTCP (RTP control protocol) is used to manage these permissions through a Talker Arbitration (TA) function commonly referred to as "floor control. Floor control is the process used to determine which participant receives permission to transmit by being granted the "floor." A floor request results from a participant in a PTT session asking permission to transmit (e.g. by pressing the PTT button on the side of a device); such permission is typically provided if no other participant has already been granted the floor.

A floor release is an indication from a speaking user that they have finished speaking (e.g. by releasing the PTT button on the side of the device). A floor grant, one possible response to a floor request, informs the requesting participant that the floor has been granted. A floor idle, a response to a floor release, informs participants that the floor is idle (i.e. that a speaking user is no longer speaking and that the floor is now generally available). A floor deny, a second possible response to a floor request, informs the requesting participant that the floor request is denied (e.g. because another user has already been granted the floor). A floor taken, sent simultaneous with a floor grant, informs all participants that the floor has been granted to the indicated participant. Floor revoke removes the permission to transmit from a user who has previously been granted the floor. RTCP BYE indicates that the sending party wants to terminate the ongoing media session in current communication context, without changing the SIP-session state.

RTCP also facilitates maintenance of quality by providing talk burst quality feedback. This feedback reports the amount of media received by UE 102, which can be compared to the amount sent by the PoC server such that a discrepancy can indicate poor network conditions that may require engagement of various compensation algorithms.

In this diagram, UE 102 may be coupled to IMS 106 (IP Multimedia Sybsystem) through access network 104 which may include both radio and non-radio types of access (i.e., UTRAN, POTS, etc.). IMS provides routing, authentication and compression services to all SIP-based applications including PoC.

GLMS 108 (Group and List Management Server) commonly manages groups, contact lists and access lists. A contact list is a kind of address book that may be used by PTT users to establish an instant talk session with other PTT users or PTT Groups and to access PTT presence information. A user may have one or several contact lists containing either identities of other PTT users or PTT Groups. Contact list management includes operations to allow the UE 102 to store, modify, retrieve and delete the contact lists located in the GLMS 108, commonly through group list management protocols, such as HTTP/XML, XCAP, etc.

In general, an end user may select a group from the contact list to initiate an instant group talk session, or a chat group talk session, depending on the type of the group. A PTT access list is used by the end user as a means of controlling who is allowed to initiate instant talk sessions to the end user and who is allowed to receive PTT presence information for a user. Access lists contains end user defined identities of other PTT end users or groups, and include a blocked identities list and a granted identities list. Presence server 112 manages presence information and generally includes a status as to whether UE 102 is online (connected to the network) and PTT available (not already busy and ready to join a session).

OTAP (Over The Air Provisioning Server) 114 generally provides all the needed configuration parameters from the service provider network for a PTT Client, and sends a WAP-push/SMS containing a binary coded XML to every client UE with default factory and network settings.

Referring now to FIG. 2, a simplified diagram of an early session early media with auto-answer mode set is shown. As previously described, the term early session generally refers to a session that is established as part of the PTT transmission, just before the invitation of other participants.

Early media normally refers to the initial transmission of a talk burst (media) prior to the completion of service negotiation and transport path establishment. That is, the sending user may transmit voice prior to the completion of a connection to any other participant. Auto-answer mode allows a UE 102 to automatically establish a session without user (i.e., participant) input. In this example, UE A 102a is a client of PoC Server A 110a, while UE B 102b is a client of PoC Server B 110b. In addition, one of the PoC Server (in this case PoC Server A) also functions as a Controlling PoC Server, managing the overall communications between UE A 102a and UE B 102b.

Initially, UE A 102a requests that a session be established by transmitting a SIP REFER message to PoC Server A 110a. That is, a user presses the PTT button on UE A 102a. Once received, a SIP 202 Accepted message is returned. PoC Server A 110a then sends a SIP INVITE request to the PoC Server B 110b.

A SIP 200 OK response, establishing early media in automode, is immediately sent back to PoC Server A 110a by PoC Server B 110b. A floor granted message is then send to UE A 102a, and a floor taken message is sent to UE B 102b. UE A 102a can now transmit an initial (i.e., first) talk burst of media.

PoC Server A 110a also transmits a SIP ACK message to PoC Server B 110b informing it of the started media transmission. A SIP NOTIFY message is also sent to UE A 102a to inform it that UE B 102b has now accepted the connection. UE A 102A responds by sending a SIP 200 OK message. Subsequently, the PTT transmission continues until the PTT button is released.

Referring now to FIG. 3, a simplified diagram of an early session with late media with manual-answer mode set is shown. Late media normally refers to the transmission of media after the completion of service negotiation and transport path establishment. Manual-answer mode requires a user (i.e., participant) to accept the establishment of a session to UE 102b prior to sending SIP 200 OK back to the originating party. As before, UE A 102a is a client of PoCS A 110a, while UE B 102b is a client of PoCS B 110b.

Initially, UE A 102a requests that a session be established by transmitting a SIP REFER message to PoC Server A 110a. That is, a user presses the PTT button on UE A 102a. Once received, a SIP 202 Accepted message is returned. PoC Server A 110a then sends a SIP INVITE request to the PoC Server B 110b.

A SIP 180 Ringing response is sent by UE B 102b to PoC Server B 102b. PoC Server B 110b forwards the SIP 180 Ringing response to PoC Server A 110a. When UE B 102B answers (i.e., user accepts the establishment of the session) a SIP 200 OK is immediately sent back to the PoC Server B 110b.

The SIP 200 OK response is then forwarded to PoC Server A 110a by PoC Server B 110b. A floor granted message is then sent to UE A 102a, and a floor taken message is sent to UE B 102b. UE A 102a can now transmit an initial (i.e., first) talk burst of media.

PoC Server A 110a also transmits a SIP ACK message to PoC Server B 110b informing it of the media transmission. A SIP NOTIFY message is also sent to UE A 102a to inform it that UE B 102b has accepted the connection. UE A 102A responds by sending a SIP 200 OK message to PoC Server A 110a, which subsequently transmits an ACK message to UE B 102b. The PTT transmission continues until the PTT button is released.

However, although PTT may provide an easy-to-use, fast, and flexible form of voice communication, PTT is also limited in that it requires a participant to be available and online at the time of the PTT session. There is currently no way to transmit a message to an unavailable participant, for later retrieval, without first accessing the traditional cellular network to leave a regular voice mail using full-duplex radio channel.

In view of the foregoing, there are desired methods of transmitting a message to a message server in a push-to-talk network

SUMMARY

The invention relates, in one embodiment, to a method of transmitting a message from a sending device to a set of receiving devices in a push-to-talk communications network. The method includes selecting the set of receiving devices from a contact list on the sending device, such that each of the receiving devices has an address on the contact list. The method also includes transmitting the message to a message server, wherein the sending device is coupled to the message server; storing the message within the message server; and assigning the message an identifier. The method further includes notifying the set of receiving devices that the message can be retrieved, wherein each of the set of receiving devices is coupled to the message server.

In one aspect, the method includes establishing a message session before the step of transmitting the message to the message server.

In another aspect, the notification is displayed in a contact list on each of the set of receiving devices.

Advantages of the invention include a standards-based solution that combines the flexibility of mobile messaging with the ease-of-use of voice.

These and other features of the present invention are described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
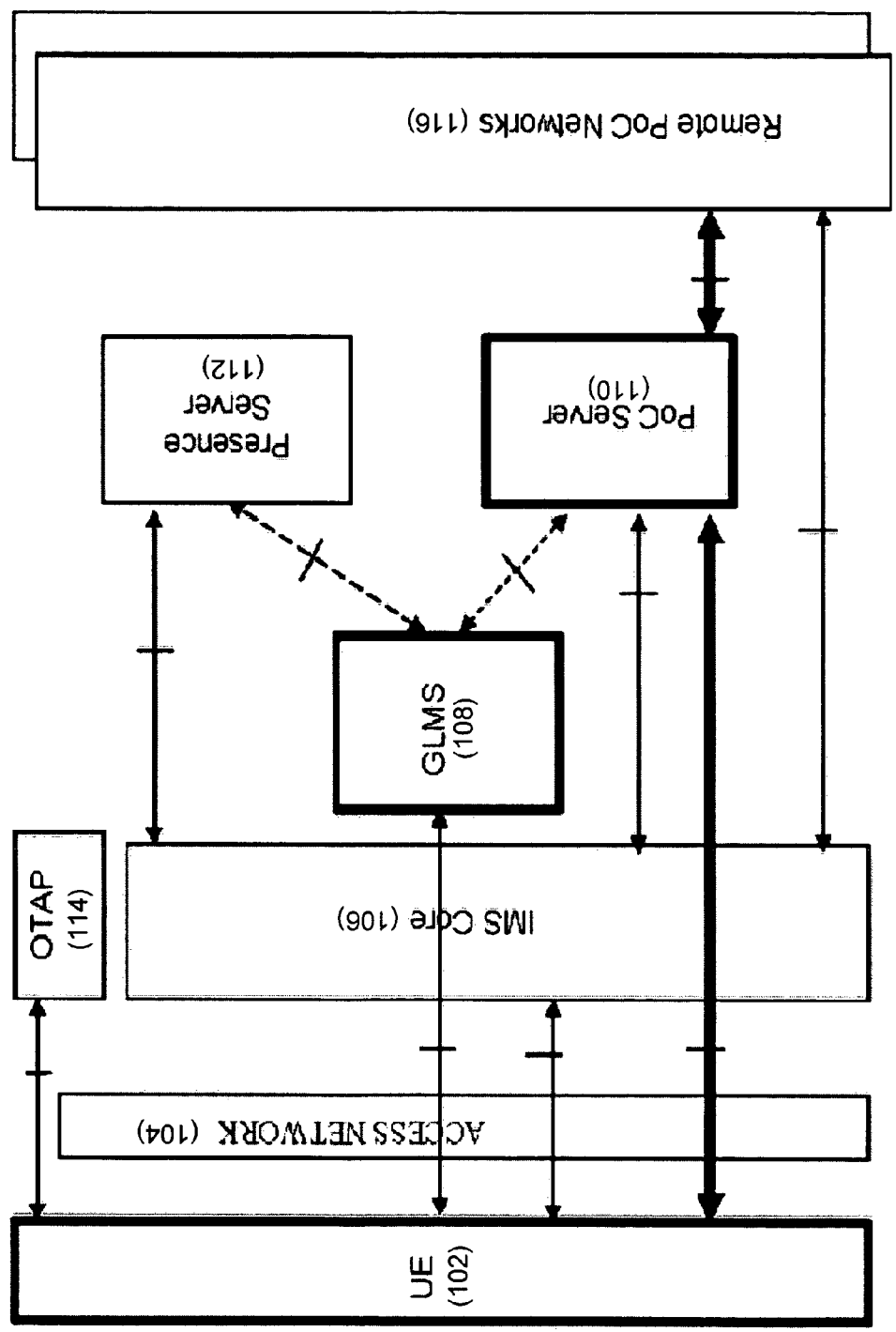
FIG. 1 shows a simplified diagram of a PTT architecture.
Figure 2:
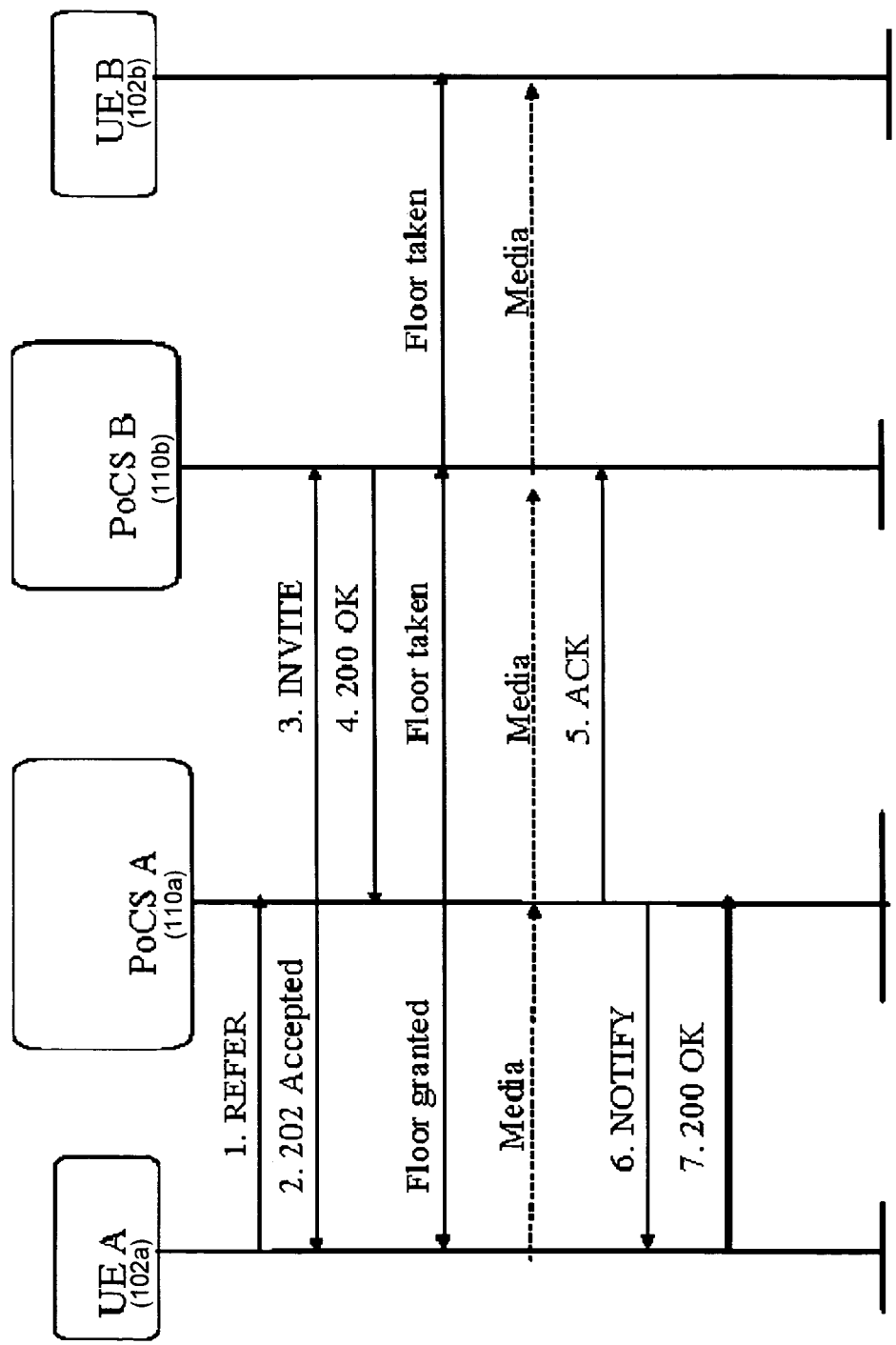
FIG. 2 shows a simplified diagram of an early session early media with auto-mode answer mode set.
Figure 3:
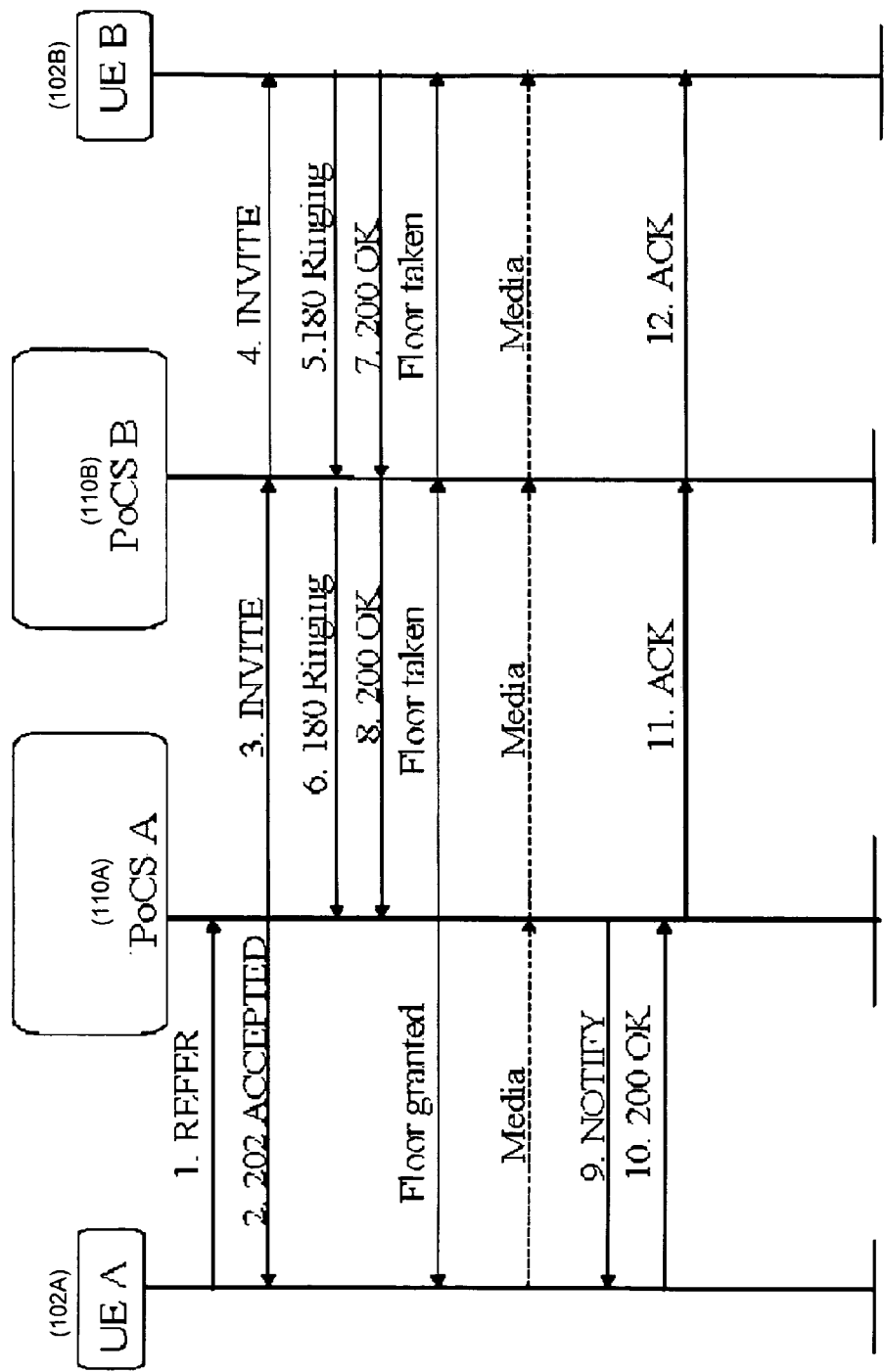
FIG. 3 shows a simplified diagram of an early session with late media with manual-answer mode set.

The present invention is described in detail with reference to a few exemplary embodiments thereof as illustrated in the accompanying drawings. In the following description, numerous specific details are set forth in order to provide a thorough understanding of the present invention.

It will be apparent, however, to one skilled in the art that the present invention may be practiced without some or all of these specific details or may be practiced with equivalents. For example, while the exemplary embodiment describes an internet protocol, other network protocols may be used. In other instances, well known process steps and/or structures have not been described in detail in order to not unnecessarily obscure the present invention.

In a non-obvious fashion, a PoC compliant signaling architecture (i.e. PoC Consortium Release I, PoC Consortium Release II or OMA POC Release I) can be utilized to send and receive stored messages, also referred to as direct voice messages (DVM). Direct Voice Messaging enables asynchronous, half-duplex communication with any user on a PTT contact list, including those indicated as 'unavailable' or 'busy' within the contact list. That is, unlike the prior art, this invention does not require a receiving participant to be both available and online at the time of DVM transmission (initial PTT session). Subsequently, a message may be transmitted, for later retrieval by an intended recipient, without first accessing the traditional cellular network and its full-duplex sending and retrieval methods for cellular voice mail services.

The invention defines mechanisms allowing the usage of native PoC clients (i.e. terminals limited to PoC Consortium Release I, PoC Consortium Release II or OMA POC Release I functionality) to be a sender or receiver of a DVM. That is, the UE may be unaware that a contact in its contact list is in actuality a DVM. The DVM message may then be modeled as any other PTT contact in the PTT contact list. As in PTT, DVM users can create and manage a contact list that may contain either individual contacts, or groups of contacts. DVM specific treatment can be triggered on the network side by selecting an additional DVM contact entry along with the selected set of PTT contacts. In another embodiment, this invention also presents methods for an enhanced PoC client providing improved user experience through a specialized DVM User Interface. This DVM-enhanced PoC client may then be using separate contact lists for inbox and sent folder respectively as well as dedicated menu options for compose, send, forward, reply and delete one or more DVM messages. Such DVM-enhanced PoC client may also offer option to jump start a DVM by selecting a user in the address book or PTT contact list, select DVM from the menu option and press the PTT button to send a DVM. Terminals that neither are native or DVM-enhanced PoC clients are denoted non-DVM clients in the following text.

The PoC DVM Server (message server) can be a PoC Server (i.e. PoC Consortium Release I, PoC Consortium Release II or OMA POC Release I) with special functions for users to send, store and retrieve a DVM rather than merely route PTT talk bursts. In one embodiment, the PoC DVM Server may be coupled to external data sources (e.g., MMS using MM7 interface, SMS using SMPP, Voice Mail using IMAP/SMTP, etc.) in order to store the DVM in existing cellular user storage facilities. Such external media store connectors can also be used for interworking with other voice mail delivery services, e.g. to receive and deliver voice mails to a non-DVM client using MMS or other voice mail services. The decoupled PoC DVM Server may still have a media resource function to be used to cache and forward a DVM after it has been retrieved, i.e. without the need of re-retrieving the DVM from the external message store. In another embodiment, an integrated PoC DVM Server may also be utilized, i.e. the complete content server function is part of the PoC DVM Server.

In one embodiment, the service provided by the PoC client and PoC DVM server comprises of sending and retrieving voice mails over a half-duplex PoC infrastructure. A DVM may then be a message sent by one user (DVM sender) and later retrieved by another user or users (DVM receiver(s) or recipient(s)) selected by the originating user. The DVM may be delivered through two separate PoC sessions, one for sending and another for receiving the DVM. Either an adhoc instant personal talk, adhoc instant group talk or pre-configured instant group talk may be utilized for the delivery. Group talk sessions may be used in case several DVMs are to be sent or retrieved. For native PoC clients (which are using a separate contact list entry for denoting DVM service), a group talk session may need to be utilized even in the case of a single DVM.

In another embodiment, a Personal Instant Alert may be used as a delivery mechanism if the PoC DVM Server receives a reply from a user via SMS and in the form of a text message. In another embodiment, an option to send a DVM may be provided in a failed PTT session (e.g. a session failed because the DVM recipient is unavailable, etc.). In another embodiment, a DVM receiver (receiving-UE) can convert a DVM session into a PTT session instead of directly replying with a DVM.

In another embodiment, the DVM is stored content referred to as infotainment. Infotainment is commonly used to describe information that is combined with entertainment content (i.e., weather report, traffic report, stock quote, movie times, etc.) available for retrieval by any end user by selecting an associated SIP URI from a list. The PTT operator may also allow a pre-view of the infotainment (e.g., a ring tone) that later can be retrieved or purchased.

For example, the selected infotainment may be purchased and delivered by subsequently selecting an additional set of SIP URIs in another DVM session, which may be coordinated by transaction rules (i.e., purchase and delivery options, digital rights management, etc.) in the PTT infrastructure. The PoC DVM Server may also act as a transaction engine following pre-configured rule settings such that a delivery participant is not triggered unless the purchase participant accepts the multi-party group session. Furthermore, such infotainment session would also preferably implement late media in order to ensure that all participants are in the session prior to starting delivery even if the setup time is longer as compared to early media generally used for voice mail.

In another embodiment, the SIP URI may include individual fields denoting transaction priority, display placement, user licensing, etc. In another embodiment, a contact list entry is automatically added to a contact list through the PoC DVM Server group management list facility, without input from the user, and as long as the user has subscribed/paid for the infotainment associated with the contact entry.

In another embodiment, a configurable parameter may be used to differentiate a DVM session from a PTT session in the IMS network. For an enhanced-DVM client, the DVMRequest parameter (i.e. +g.poc.talkdvmburst, etc.) would be added in the accept-contact header.

A global group identifier may also be used to identify the pre-configured or adhoc instant group talk. For a DVM-enhanced PoC client, this DVMRequest parameter (i.e. comp-ad-hocGroupDvmRequest, retr-ad-hocGroupDvmRequest, etc.) can replace the AdhocGroupRequest parameter in PoC and as such be added to the "Request-URI" and "To" fields respectively in the SIP Invite request.

For a native PoC client, the DVMRequest parameter can be treated as an additional participant in the PoC session formed as any other participant SIP URI (Session Initiation Protocol Universal Resource Identifier) placed in the "Refer-To" field of the SIP Invite message. As there likely is more than one participant in a PoC DVM session, the list of participants, except the first, will go into the body of the SIP Invite message. The PoC DVM Server, or any SIP proxy in the IMS Core, may then need to search for the DVMRequest parameter in the body of the message in order to trigger special DVM handling. If the DVMRequest parameter is moved to the top of the list through group management procedures and as such is in the "Refer-To" field when the SIP Invite message is sent, header inspection will suffice also in the case of native PoC clients.

A SIP URI may also be used to uniquely identify an individual message. In the case of a voice mail service, the SIP URI may be used to associate the DVM with the recipient(s). The SIP URI functions as a pointer to the message stored on the PoC server, or other external voice mail store. That is, the message store may be integrated directly into the push-to-talk communications network, or exist as a separate application that is external to it, such as a $3^{rd}$ party message store. The SIP URI may also be given an internal structure where an individual element of the SIP URI carries a special meaning. Examples of such meaning are recipient, transaction priority, contact list placement and user license id. The latter aspects are especially useful in infotainment services.

In general, composing a DVM is a relatively straightforward process. The DVM sender selects a DVM recipient(s) from a contact list on the user's UE (e.g., cell phone, etc.), and initiates a DVM session. In one embodiment, when using a DVM-enhanced PoC client, the DVM sender may indicate a desire to initiate a DVM session (instead of a PTT session) with the DVM recipient by selecting the DVM recipient from a contact list, and subsequently selecting a DVM menu option.

In another embodiment when using a native PoC client, the DVM sender may select a DVM recipient (acting as trigger for DVM call) along with other non-DVM recipients (i.e., PoC recipients), such that a DVM session is established instead of a PTT session to the selected PoC recipients.

Selecting intended recipients and pressing the PTT button starts the sending DVM session. In effect, the sending user participates in a uni-directional (i.e. voice is sent but not received) half-duplex PTT session with a PoC DVM server (message server), which acts as a representative of the receiver or receivers. A beeping signal may be received by the DVM sender notifying him that a media channel has been established. The DVM sender may then start to speak, with the spoken media being transmitted to the PoC DVM server, which stores the received media and associates it with a SIP URI that is unique within a given namespace or network as explained above.

The SIP URI may then be subsequently added to each DVM receiver's contact list (inbox), where it can be used for later message retrieval. The SIP URI may also be added to the DVM sender sent folder in the contact list, where it can be replayed by the sender. In order to conserve network resources, both the received DVM SIP URI and the sent DVM SIP URI may both logically point to the same physical location on the message store. When the PTT button is released, the DVM sender may receive a "beeping" sound notifying him that the floor is idle.

In addition, because a PTT session generally indicates participants in that session, entering a DVM session with the selected DVM recipients enables the DVM sender to validate that the correct DVM recipient(s) has been selected before the PTT button is depressed and transmission begins. In one embodiment, the contact list generally serves as the principal DVM display area, and users are generally returned to it after the DMV transmission is complete. In another embodiment, the DVM session is ended immediately upon release of the PTT button. In another embodiment, multiple transmissions may be sent; with the DVM session explicitly ended by the user via, e.g., a menu option (in case of a DVM-enhanced PoC client).

When a DVM is received, an audible alert may sound or a visual alert may display on the DVM recipient's UE. A contact list may be used as a record of received DVMs, and hence may functionally operate as an inbox. The SIP URI of a transmitted DVM appears as a contact in a contact list accessible by the intended DVM recipient(s) such that selecting the contact list entry (which represents the stored message) initiates a PTT session with the message, and the PoC DVM Server storing the message, enabling the DVM recipient to hear the message. In effect, the DVM recipient is participating in a uni-directional (i.e. voice is received but not sent) half-duplex PTT session with a DVM server, which acts as a representative of the sender.

In another embodiment, the SIP URI of a transmitted DVM appears as a member of a pre-defined Instant Talk group such that initiating a PTT session with the group enable a particular DVM recipient to enter a PTT session and subsequently hear all messages associated with the group. In one embodiment, when using a native PoC client, a transmitted DVM may appear in the common PTT contact list and indicate the sender. The received DVMs may be listed chronologically within the designated contact list. The DVM server may assign display names to each received DVM such that the representative entry on the contact list has a display name that indicates such information as the sender, the transmission date, and whether the message is unheard. In another embodiment, when using a DVM-enhanced PoC client, the DVM may appear in a separate inbox and indicate the message sender, when it was sent, message length, and whether it has already been heard through a specialized DVM graphical user interface display and enhanced group list management metadata retrieval from the POC DVM Server.

If multiple messages are selected, the user is in effect participating in a PTT session with the DVM server representing multiple participants, with each selected message played sequentially with the most recent message played first. Playback may pause for two seconds between messages. An icon may indicate which message in the message list is being played back in case of a DVM-enhanced PoC client. During message playback, the user may stop and return to the inbox by selecting the "stop" function. If multiple messages are selected, stopping to play a message will initiate the play of the next message in the queue. The PTT button can be used to provide similar "stop" functions. The release of the PTT button would then trigger floor idle in the POC DVM Server and the associated granting of the floor to the next DVM message in line.

To reply to a message, the user may select a specific or multiple DVMs and select the "reply" menu function. The device may then enter the compose mode, as previously described, with the display listing the sender(s) of the DMV(s) selected. The UE display for replying to a DVM is thus similar to the one used for sending a new DVM. As mentioned before, the user may also optionally select to establish a pure PTT call instead of sending another DVM message in reply.

When receiving a reply the original sender can select to listen to the originally sent message as stored in the sent folder in order to understand the context of the reply. In one embodiment, the SIP URI of the sent DVM and the SIP URI of the reply DVM are associated in the POC DVM Server.

The recipient can also select to forward a DVM to another recipient. The forwarding DVM sender can then add an associated voice mail to the forwarded voice mail. In one embodiment, the POC DVM Server may keep a cache of the forwarded voice mail for a certain amount of time in order to avoid the process of re-retrieving the DVM, although the original DVM itself may resided on an external voice mail.

To permanently delete a DVM, the user may select the DVM(s) and then select the "delete" menu function. This engages the PoC GLMS list management protocols to delete any entry from a contact list. Optionally, the PTT carrier may limit the total number of DVMs allowed in an inbox at one time. This control may be granular to the per-user level. This enables the carrier implement class of service related to inbox size.

As commonly used in email applications, a carrier may also limit the total size of the DVM inbox/sent folder, as well as the length and storage size of a DVM. These controls may be granular to the per-user level, and enable the operator to maintain, and hence charge, for varying classes of service. An example of this in the Infotainment area would be for the operator or vendor to sell slot spaces on the contact list. The higher up on the list the more costly for the value added service provider. In addition, these controls may protect users from receiving endless DVM.

Since the concept of PTT was principally focused on instant communication between available parties, signaling mechanisms do not generally exist for the transmission of a DVM stream, or any other type of stored transmissions (i.e., video, static picture, music, etc.).

Figure 4:
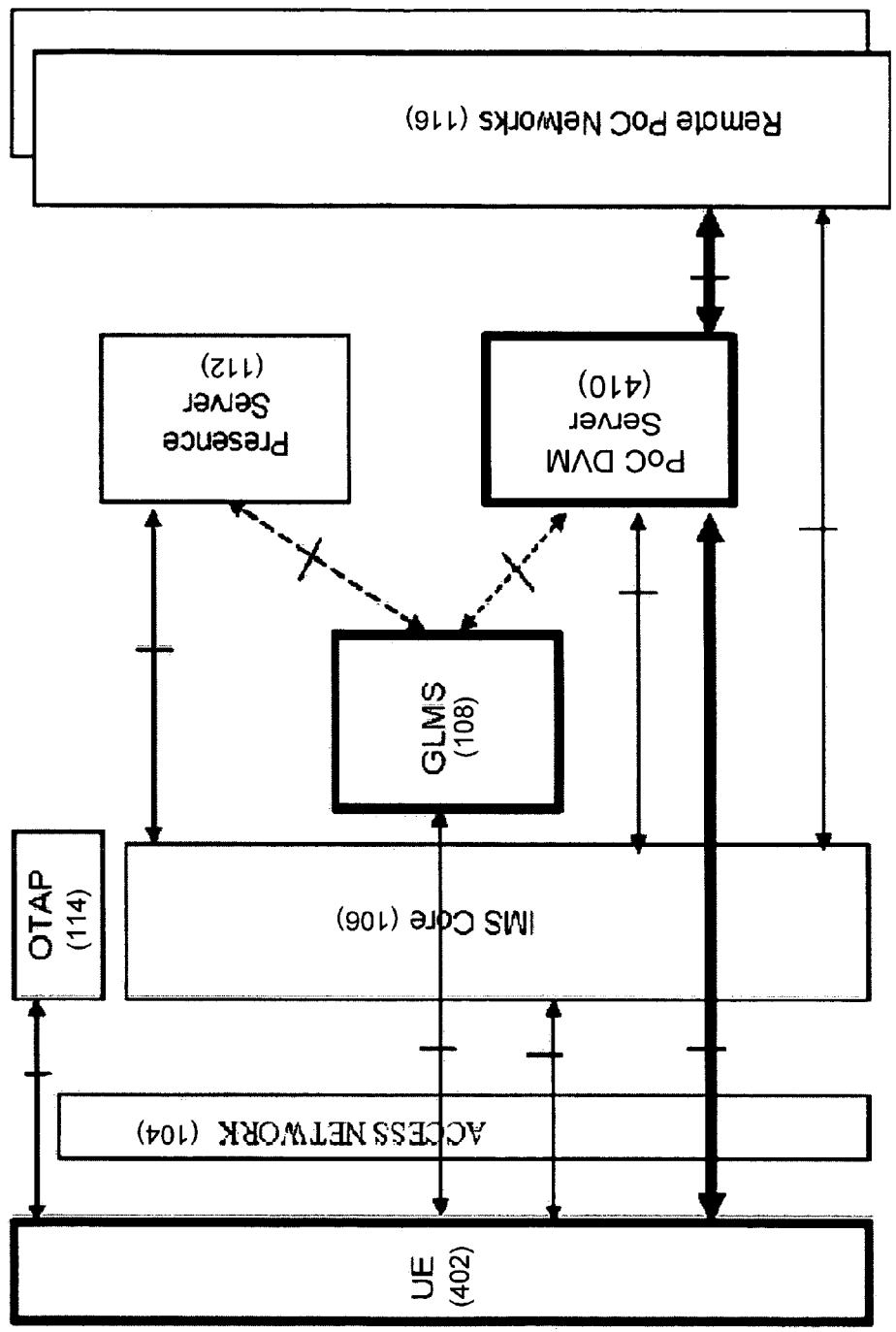
FIG. 4 shows a simplified diagram of a PTT architecture in which a DVM can be transmitted and received, according to one embodiment of the invention.

Referring now to FIG. 4, a simplified diagram of a PTT architecture in which a DVM can be transmitted and received is shown, according to one embodiment of the invention. As previously described, UE 402 generally refers to the device containing the PTT application client software, such as a cellular phone, which can optionally be enhanced with extra DVM features for better display and administrative functions.

As in a regular PTT implementation, UE 402 has an interface on the network side to OTAP server 114 for the purpose of get initial configuration. UE 402 also has an out-of-bound HTTP/XML interface to the GLMS 108. However, in a non-obvious way, one of the contact lists may be considered a DVM inbox where received DVMs can be selected and played. Each entry on any PTT contact list is uniquely identified within a given namespace or network using a SIP URI. In a PTT context, the SIP URI represents another end user such that selecting the entry initiates a communication session between two end users.

In a DVM context, the SIP URI represents a message such that selecting the entry initiates a PTT communication session between the end user and the DVM server such that the DVM server may stream the message to the end user. That is, each message appears as a contact in the UE contact list, and one can initiate a session using that contact list entry such that the media associated with the SIP URI referred to by the contact list entry may be streamed from the DVM server to the end user. In another embodiment, PTT groups can be used in a non-obvious way to enable a user to receive DVMs such that the group member list contains SIP URI entries that represent DVMs. In this embodiment, the user would initiate a PTT session with the group such that the group "members" (DVM messages) would transmit their media to the user.

UE 402 may also have two SIP-based interfaces. One for Presence Server 112 and used to update and subscribe to user status (i.e., logged-on or logged-out). The other SIP interface may be to the DVM PoC server 410 (message server) and may be used for establishing a PTT session as well as a session for sending or retrieving a DVM. As previously described, once the session is established, RTP (real time transmission protocol) is used for the transmission of the DVM. RTCP (RTP control protocol) is also used for Talker Arbitration (TA), commonly referred to as floor control. In one embodiment, DVM PoC server 410 is a message store.

Figure 5:
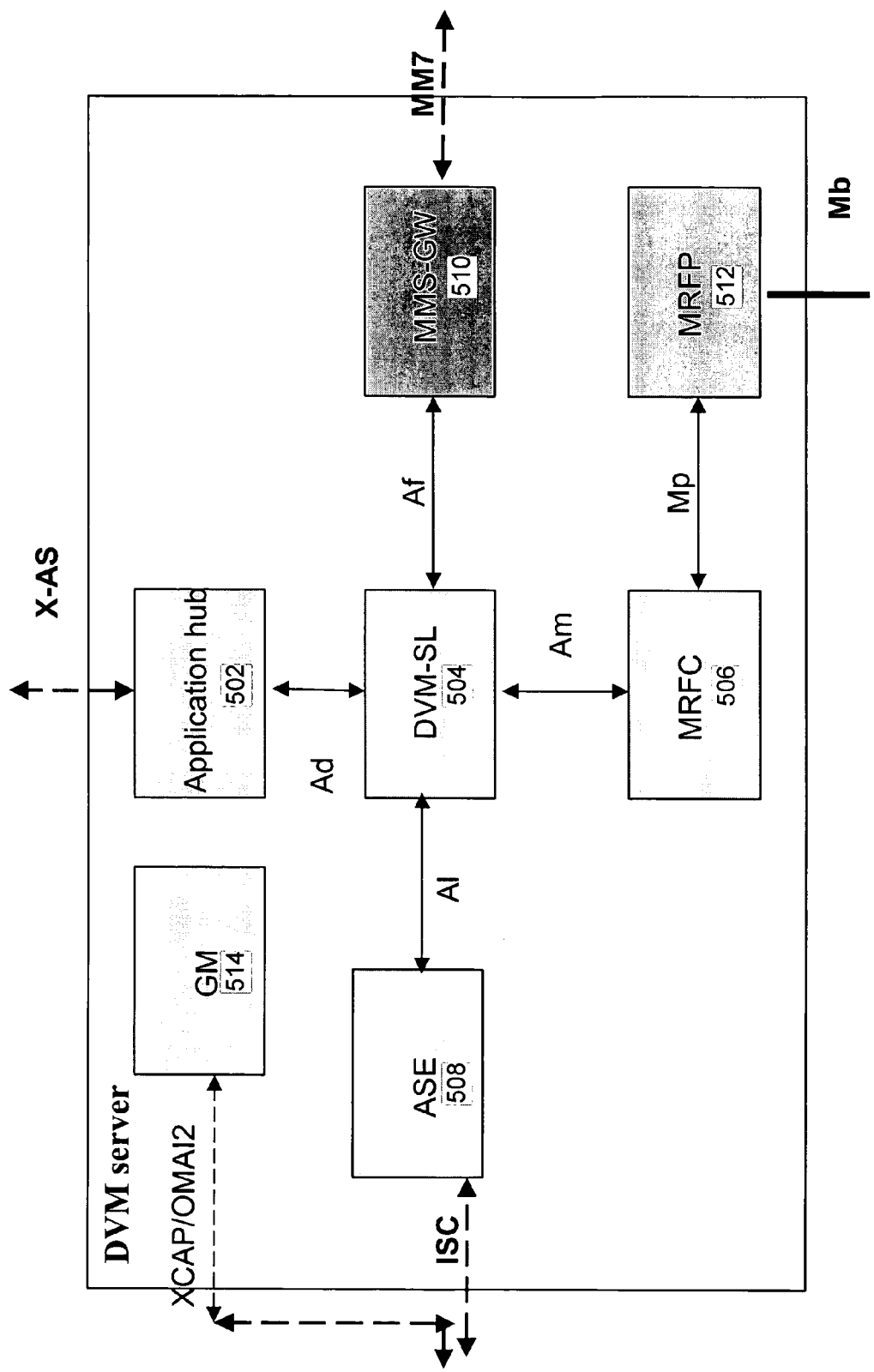
FIG. 5 shows a simplified functional diagram of a DVM server, according to one embodiment of the invention.

Referring now to FIG. 5, a simplified functional diagram of DVM server 410 is shown, according to one embodiment of the invention. DVM-SL 504 (Direct Voice Messaging Service Logic) contains the logic of DVM service by, among others, providing the following features:

Maintaining DVM sessions
Checking on DVM access privileges
Rewriting the recipient URL to an individual DVM-BOX
Keeping track of each DVM by maintaining a URL
Generating a unique URL for each new DVM
Maintaining each user's DVM list Coupled to DVM-SL 504 may be application hub 502, an entity that makes DVM service available to a 3rd party application server by providing a DVM plug-in, for example running Parlay-X. It may also provide a set of interfaces to other DVM server internal services and service enablers for fulfilling DVM service offering.

The Ad interface is commonly used between DVM-SL 504 and application hub 502. Ad is an open DVM based interface that may be used to extend the DVM functionality to 3rd party application server. In addition, GM 514 (Group Management or Group List Management Server) can communicate with the UE 402, as shown in FIG. 4, through the XCAP/OMAI2 interface. XCAP/OMAI2 is provided directly to user for the purpose of removing DVM.

Also coupled to DVM-SL 504 is ASE 508 (Application Service Environment). ASE 508 represents and models the communication to IMS core. ASE 508 may provide the entire communication primitive that a DVM-SL 504 needs in order to enter into DVM session with UE 402, as shown in FIG. 4, and into a communication session with the DVM server, which acts as a representative of the receiving user for the duration of the PTT session, that is, it receives a voice message on behalf of the end user. This communication may include call setup messages to and from UE 402 over IMS core 106, as shown in FIG. 4, using the SIP protocol.

MRFC 506 (Media Resource Function Controller) provides the means for DVM-SL 504 to communicate with a MRFP 512 (Media Resource Function Processor) for the purpose of performing DVM related media actions such as RTCP floor control and RTP switching. The Am interface is generally used to communicate between DVM-SL 504 and MRFC 506. Am is a 3261 SIP extension based interface in binary format. This interface covers the signaling regarding the following actions: composing a DVM, retrieving to a DVM, and replying to DVM.

MMS-GW 510 communicates with MMSC (Multimedia Service Controller not shown) on behalf of DVM-SL 504 for the purpose of sending/receiving DVM attachments. In another embodiment, MMS-GW 510 can communicate with a Circuit Switched (CS) voice mail server. In another embodiment, the DVM may be transcoded when transmitted to or from an external mail store. Transcoding generally refers to the process of converting a DVM from one format to another.

The Af interface is commonly used to communicate between MMS-GW 510 and DVM-SL 504. Af is a MM7 (SOAP) based interface that let the DVM server appear as a VASP towards the MMSC. This interface covers following areas: submitting/retrieving a DVM to the user in a different domain or to the user in the same domain.

Furthermore MMS-GW 510 may also communicate with MRFP 512 with purpose of providing stream source/destination for DVM contents. Note that the MMS-GW 510 may be replaced by another gateway when interfacing other media stores, such as Circuit Switched Voice Mail Servers. MMS-GW 510 can further communicate with MRFP 512 using the Ah interface. Ah is a HTTP based interface for providing stream source and destination towards MRFP for recording as well playing streams of DVM.

Referring now to APPENDIX, a simplified data schema used for a DVM is shown, according to one embodiment of the invention. The "application/vnd.poc.dvm.group-event+xml" content type carries, in PoC, a free text string of DVM group member sender display name(s) and URI(s). For example, a content type application/vnd.poc.dvm.refer-to may be deployed for supporting an instant group and ad-hoc group message where the push-to-talk infrastructure is capable of discover the DVM service identifier as part of the recipient list as distributed across the Refer-To header and body attributes.

Figure 6:
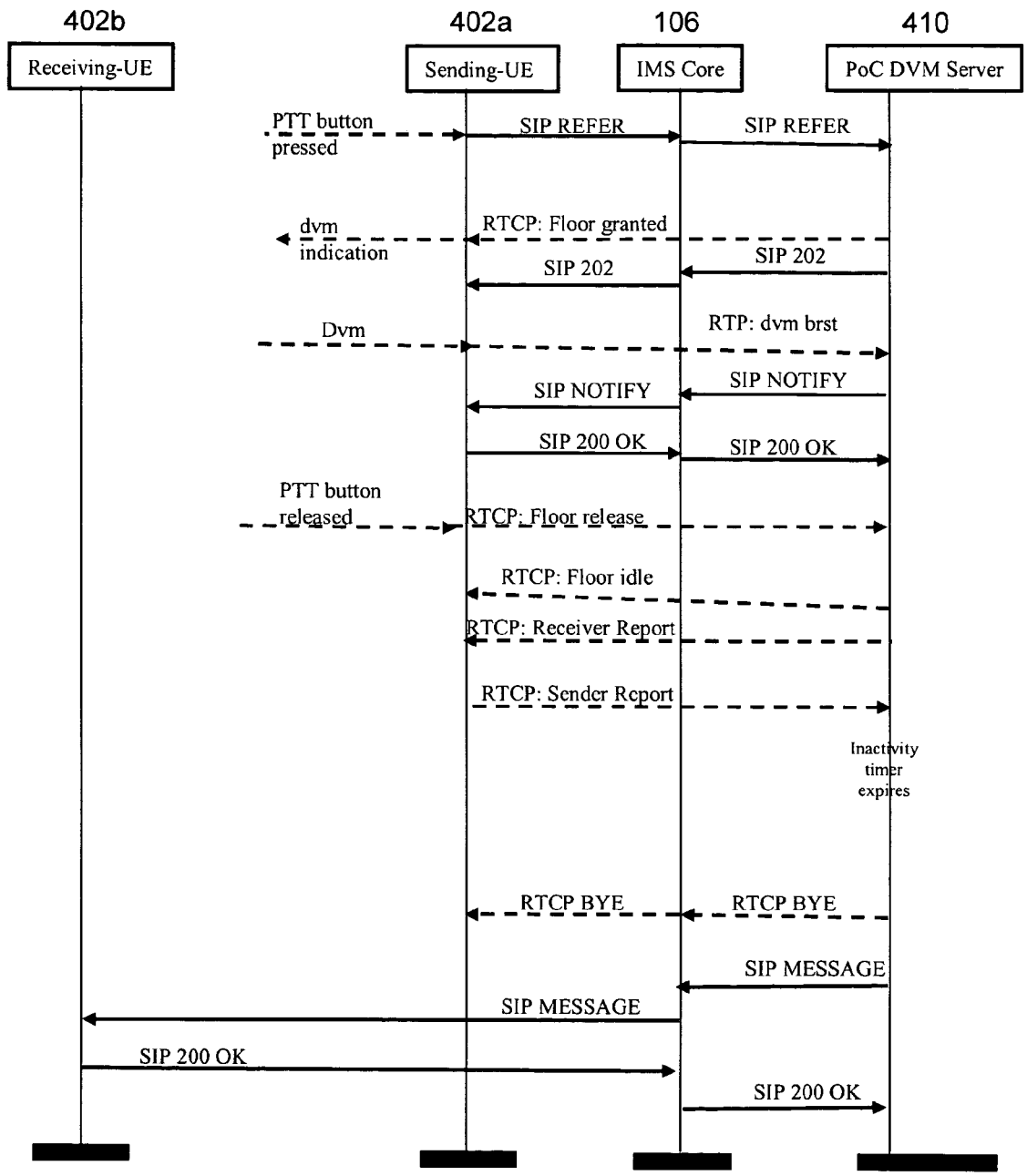
FIG. 6 shows a simplified signal flow in a network configured for early session, early media establishment, in which a DVM is exchanged between a Sending-UE (sending device) and a Receiving-UE (receiving device), according to one embodiment of the invention.

Referring now to FIG. 6, a simplified signal flow in a network configured for early session, early media establishment is shown, in which a DMV is exchanged between a Sending-UE (sending device) and a Receiving-UE (receiving device), according to one embodiment of the invention. As previously described, the term early session refers to a session that is already available for quick connection establishment. Early media normally refers to the initial transmission of a talk burst (media) prior to the completion of service negotiation and transport path establishment. That is, early media enables an initiating user to speak prior to any other participant accepting the session invitation; in this case, the spoken media is typically buffered within the network until a connection is completed with the terminating user(s), at which point the buffered media is released and streamed to the receiving user. In another embodiment, late media and on-demand session may also be used as defined in the PoC standard.

Initially, a user may press a PTT button on Sending-UE 402a, which in turn sends a SIP REFER request to message server 410 and establishes a session. A RTCP message is subsequently returned notifying Sending-UE 402a that it has been granted the floor. In addition, a SIP 202 Accepted response is also sent by message server 410, signaling to Sending-UE 102a that it can transmit an initial (i.e., first) talk burst of media. After the initial talk burst is received, message server 410 sends Sending-UE 402a a SIP NOTIFY request to inform it that the connection has been accepted. Upon release of the PTT button, Sending-UE 402a sends a RTCP floor release message to message server 410, signaling the end of the message.

In one embodiment, message server 410 then sends a RTCP Floor Idle message informing all participants that the floor is idle. In another embodiment, the DVM server will end the session after receiving the initial talk burst, such that the end user may only send a single burst (e.g. a single message) per DVM session. If the DVM server does not terminate the session, session statistics are exchanged between Sending-UE 402a and message server 410 in the form of a RTCP Receiver Report and an RTCP sender report. After an inactivity timer expires, message server 410 sends a RTCP BYE message to Sending-US 402a. A DVM notification in the form of a SIP message may then be sent by message server 410 to Receiving-UE 402b, the intended DVM recipient, which subsequently returns a SIP 2000K message, acknowledging receipt.

Figure 7:
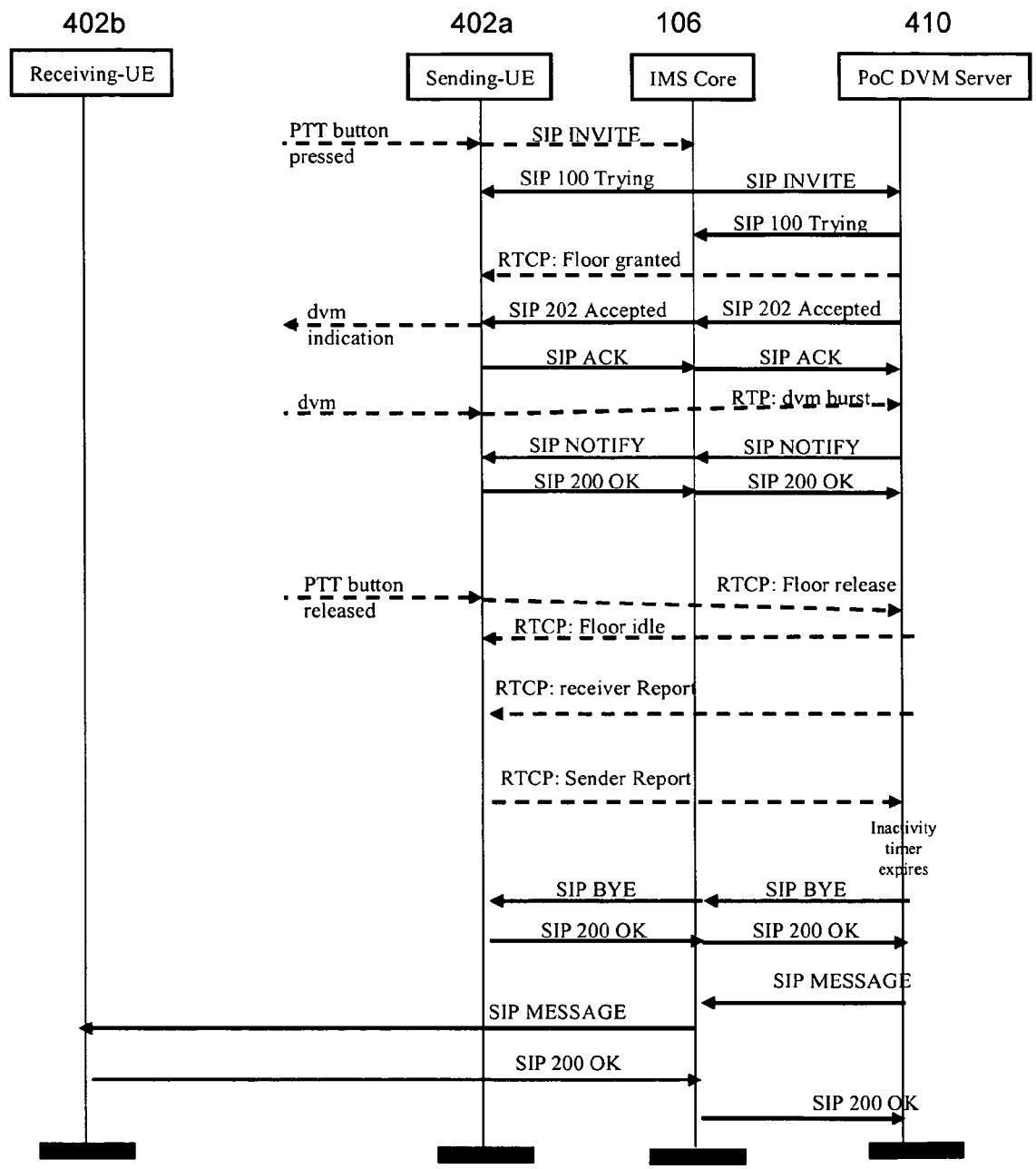
FIG. 7 shows a simplified signal flow in a network configured for on demand session, early media establishment, in which a DVM is exchanged between a Sending-UE and a Receiving-UE, according to on embodiment of the invention.

Referring now to FIG. 7, a simplified signal flow in a network configured for on demand session, early media establishment is shown, in which a DMV is exchanged between a Sending-UE and a Receiving-UE, according to on embodiment of the invention. As previously described, an on demand session generally refers to a session that is established as part of the PTT transmission. Early media normally refers to the initial transmission of a talk burst (media) prior to the completion of service negotiation and transport path establishment. That is, prior to any other participant accepting the session invitation.

Initially, a user may press a PTT button on Sending-UE 402a, which in turn sends a SIP Invite message to message server to join the session. As message server 410 joins, it sends a SIP 100 Trying message to Sending-UE 402a. A RTCP message is subsequently returned notifying Sending-UE 402a that it has been granted the floor. In addition, a SIP 202 Accepted response is also sent by message server 410, signaling to Sending-UE 102a that it can transmit an initial (i.e., first) talk burst of media. After the initial talk burst is received, message server 410 sends Sending-UE 402a a SIP NOTIFY request to inform it that the connection has been accepted. Sending-UE 402a, in turn, responds with a SIP 200 OK message. Upon release of the PTT button, Sending-UE 402a sends a RTCP floor release message to message server 410, signaling the end of the DVM.

Message server 410 then sends a RTCP Floor Idle message informing all participants that the floor is idle. Next, session statistics are exchanged between Sending-UE 402a and message server 410 in the form of a RTCP Receiver Report and an RTCP sender report. After an inactivity timer expires, message server 410 sends a SIP BYE message to Sending-UE 402a. Sending-UE 402a, in turn, responds with a SIP 200 OK message.

A DVM notification in the form of a SIP message may then be sent by message server 410 to Receiving-UE 402b, the intended DVM recipient, which subsequently returns a SIP 200 OK message, acknowledging receipt.

Figure 8:
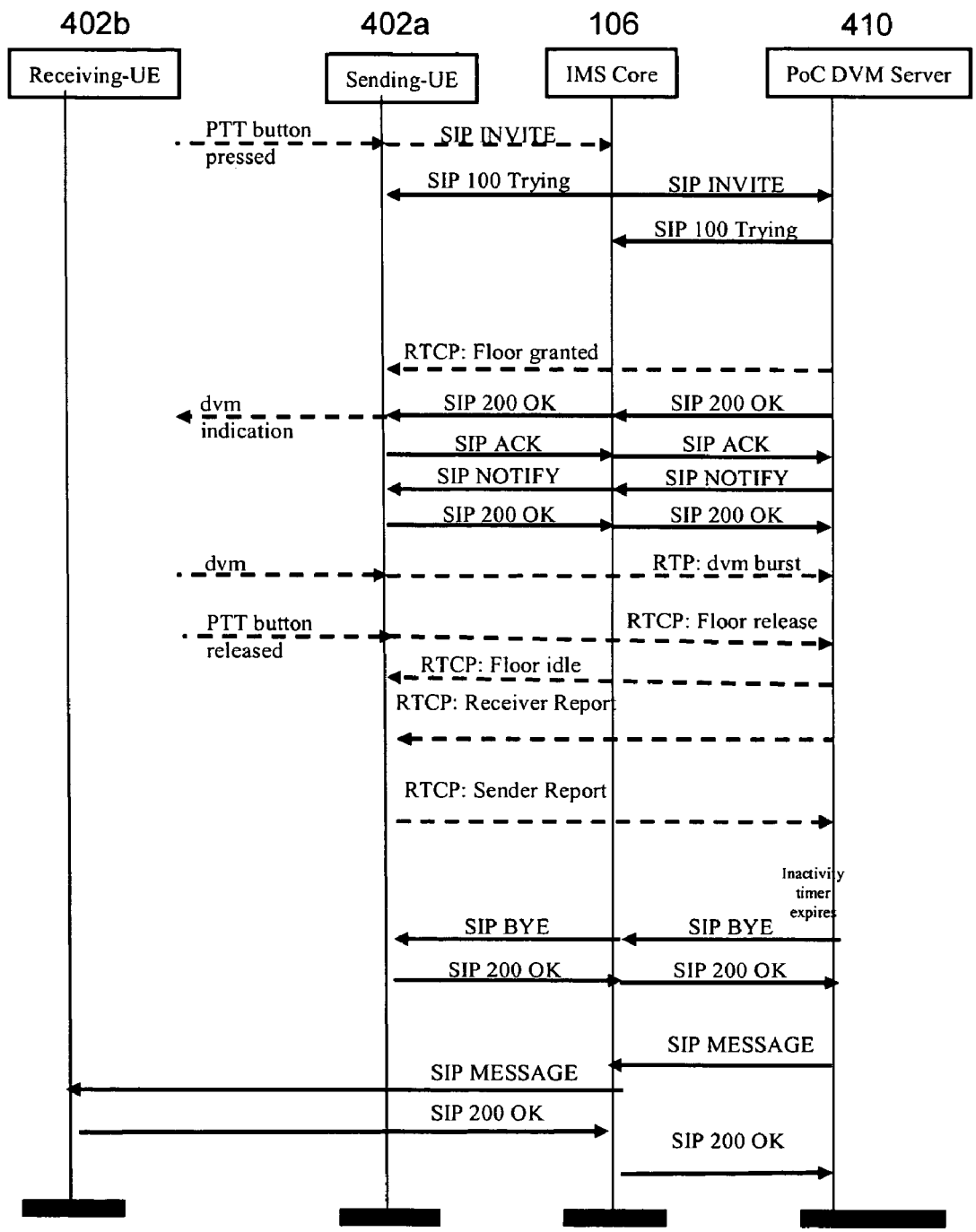
FIG. 8 shows a simplified signal flow in a network configured for on demand session, late media establishment, in which a DVM is exchanged between a Sending-UE and a Receiving-UE, according to on embodiment of the invention.

Referring now to FIG. 8, a simplified signal flow in a network configured for on demand session, late media establishment is shown, in which a DMV is exchanged between a Sending-UE and a Receiving-UE, according to one embodiment of the invention. As previously described, the term on demand session generally refers to a session that is established as part of the PTT transmission. Late media normally refers to the transmission of media after the completion of service negotiation and transport path establishment.

Initially, a user may press a PTT button on Sending-UE 402a, which in turn sends a SIP Invite message to message server 410 to join the session. As message server 410 joins, it sends a SIP 100 Trying message to Sending-UE 402a. A RTCP message is subsequently returned notifying Sending-UE 402a that it has been granted the floor. Message server 410 also sends UE 402a a SIP 200 OK message, which is acknowledged with a SIP ACK message. Message server 410 also sends UE 402a a SIP Notify message, which is again acknowledged with a SIP ACK message.

Sending-UE 402a then transmits the DVM. Upon release of the PTT button, Sending-UE 402a sends a RTCP floor release message to the message server 410, signaling the end of the DVM. Message server 410 then sends a RTCP Floor Idle message informing all participants that the floor is idle. Next, session statistics are exchanged between Sending-UE 402a and message server 410 in the form of a RTCP Receiver Report and an RTCP sender report. After an inactivity timer expires, message server 410 sends a SIP BYE message to Sending-US 402a. Sending-UE 402a, in turn, responds with a SIP 200 OK message.

A DVM notification in the form of a SIP message may then be sent by message server 410 to Receiving-UE 402b, the intended DVM recipient, which subsequently returns a SIP 200 OK message, acknowledging receipt.

Figure 9:
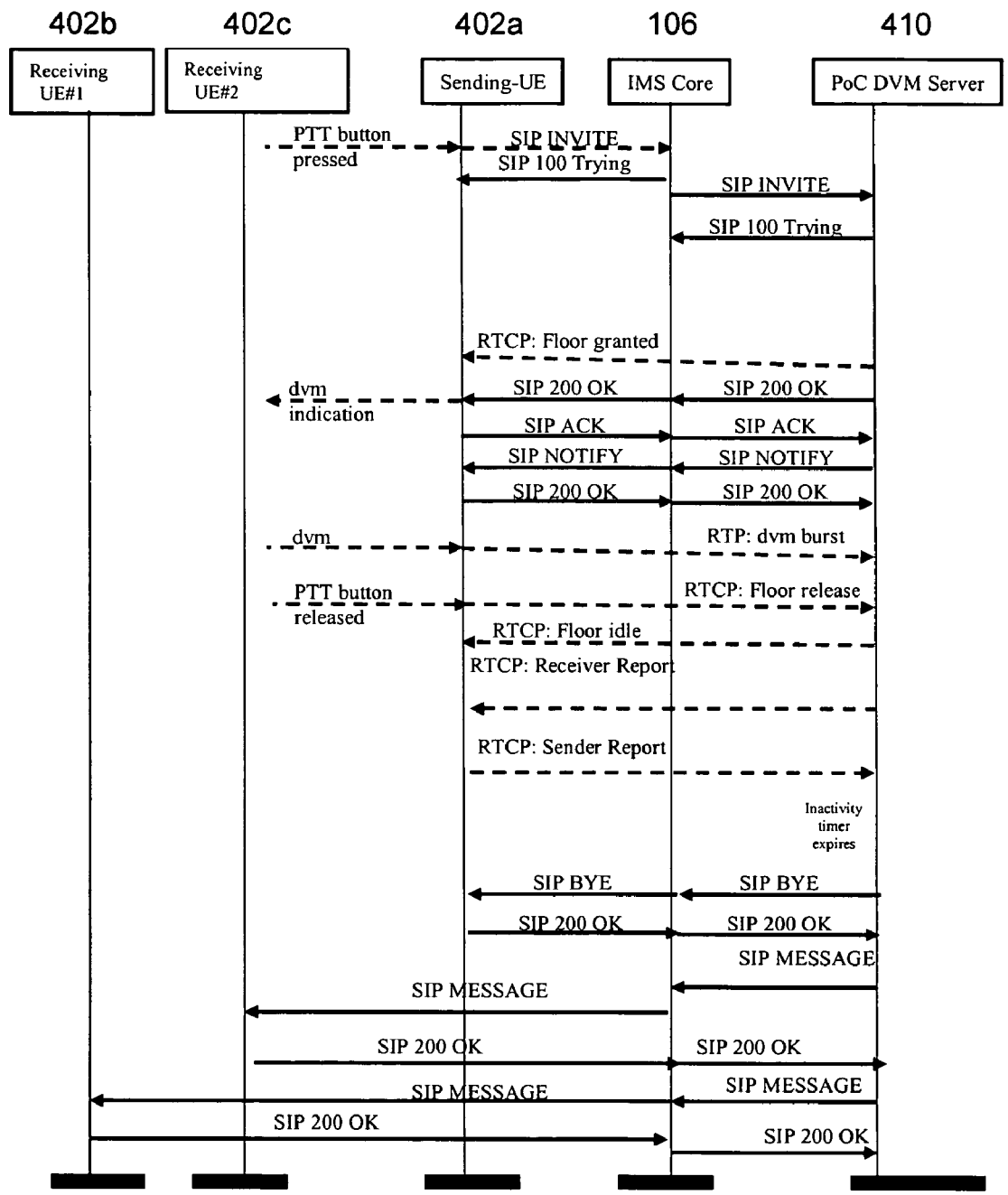
FIG. 9 shows a simplified signal flow in a network configured for on demand session, late media establishment, in which a DVM is exchanged between a Sending-UE and a two Receiving-UE's, according to on embodiment of the invention.

Referring now to FIG. 9, a simplified signal flow in a network configured for on demand session, late media establishment is shown, in which a DMV is exchanged between a Sending-UE and two Receiving-UE's, according to one embodiment of the invention. The term on demand session generally refers to a session that is established as part of the PTT transmission. Late media normally refers to the transmission of media after the completion of service negotiation and transport path establishment.

Initially, a user may press a PTT button on Sending-UE 402a, which in turn sends a SIP Invite message to the message server to join the session. As message server 410 joins, it sends a SIP 100 Trying message to Sending-UE 402a. A RTCP message is subsequently returned notifying Sending-UE 402a that it has been granted the floor. Message server 410 also sends UE 402a a SIP 200 OK message, which is acknowledged with a SIP ACK message. Message server 410 also sends UE 402a a SIP Notify message, which is again acknowledged with a SIP ACK message.

Sending-UE 102a then transmits the DVM. Upon release of the PTT button, Sending-UE 402a sends a RTCP floor release message to message server 410, signaling the end of the DVM. Message server 410 then sends a RTCP Floor Idle message informing all participants that the floor is idle. Next, session statistics are exchanged between Sending-UE 402a and message server 410 in the form of a RTCP Receiver Report and an RTCP sender report. After an inactivity timer expires, message server 410 sends a SIP BYE message to Sending-US 402a. Sending-UE 402a, in turn, responds with a SIP 200 OK message.

A DVM notification in the form of a SIP message may then be sent by message server 410 to Receiving-UE 402b and Receiving-UE 402c, the intended DVM recipients, which subsequently return a SIP 200 OK message, acknowledging receipt.

Figure 10:
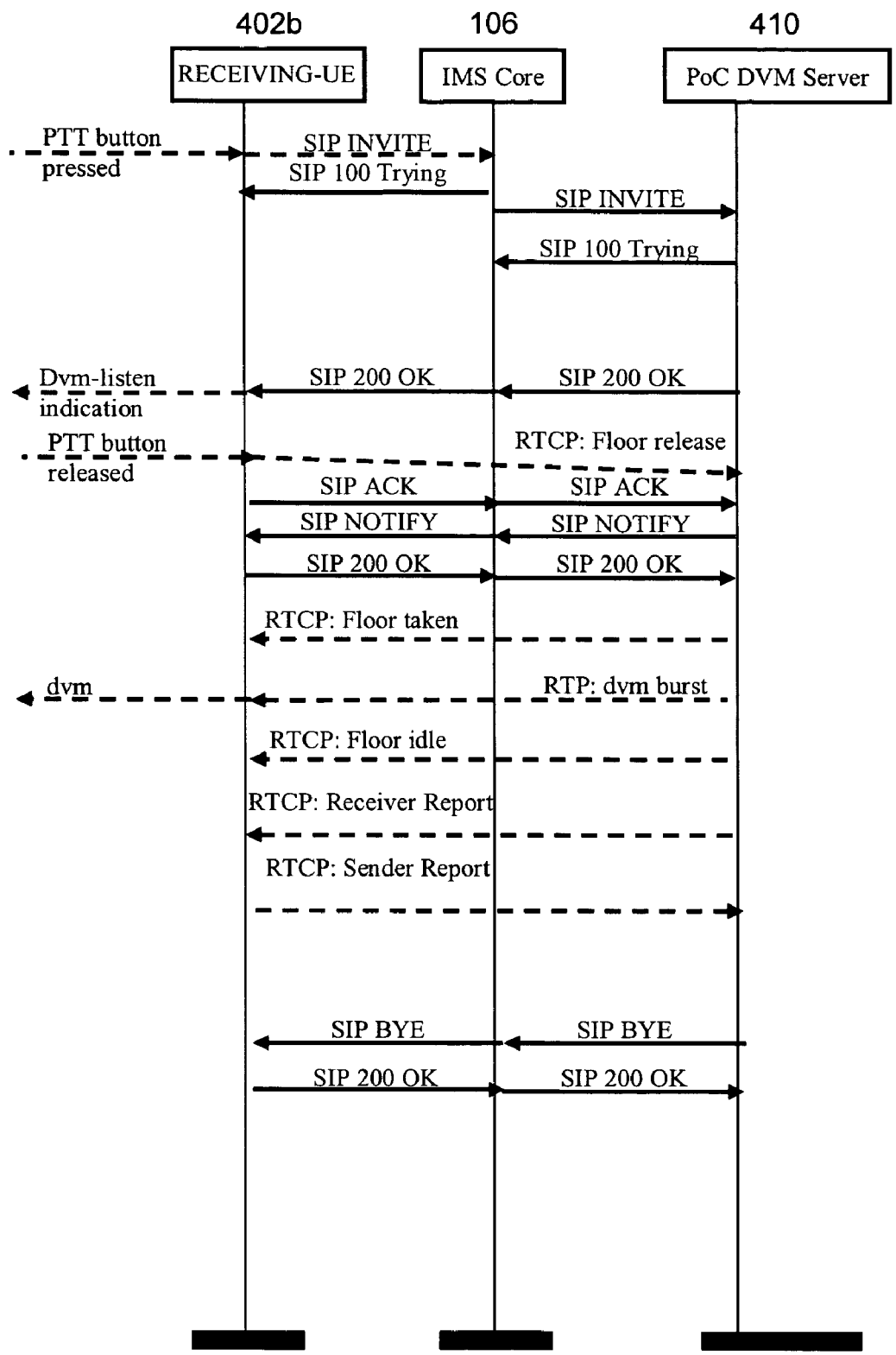
FIG. 10 shows a simplified signal flow in a network configured for on demand session, late media establishment, in which a DVM is retrieved by a Receiving-UE, according to on embodiment of the invention.

Referring now to FIG. 10, a simplified signal flow in a network configured for on demand session, late media establishment is shown, in which a DVM is retrieved by a Receiving-UE, according to one embodiment of the invention. The term on demand session generally refers to a session that is established as part of the PTT transmission. Late media normally refers to the transmission of media after the completion of service negotiation and transport path establishment.

Initially, a user may press a PTT button on Sending-UE 402a, which in turn sends a SIP Invite message to the message server 410 to join the session. As message server 410 joins, it sends a SIP 100 Trying message to Sending-UE 402a. Once message server 410 joins the session, it sends a SIP 200 OK message to Receiving UE 402b, which appropriately notifies the user with a tone or visual indicator.

Upon release of the PTT button, Receiving-UE 402b sends a RTCP floor release message to message server 410, signaling that it has chosen the appropriate DVM to retrieve. Receiving-UE 402b also sends a SIP ACK, to which message server responds with a SIP Notify. Receiving-UE 402b replies with a SIP 200 OK, after which message server 410 signals to all participants with a RTCP message that it has been granted the floor. The DVM is subsequently retrieved.

Upon completion of the retrieve, DVM Server 410 then sends a RTCP Floor Idle message informing all participants that the floor is idle. Next, session statistics are exchanged between Receiving-UE 402b and message server 410 in the form of a RTCP Receiver Report and an RTCP sender report.

Message server 410 then sends a SIP BYE message to Receiving-UE 402b which is subsequently acknowledged with a SIP 200 OK message.

Figure 11:
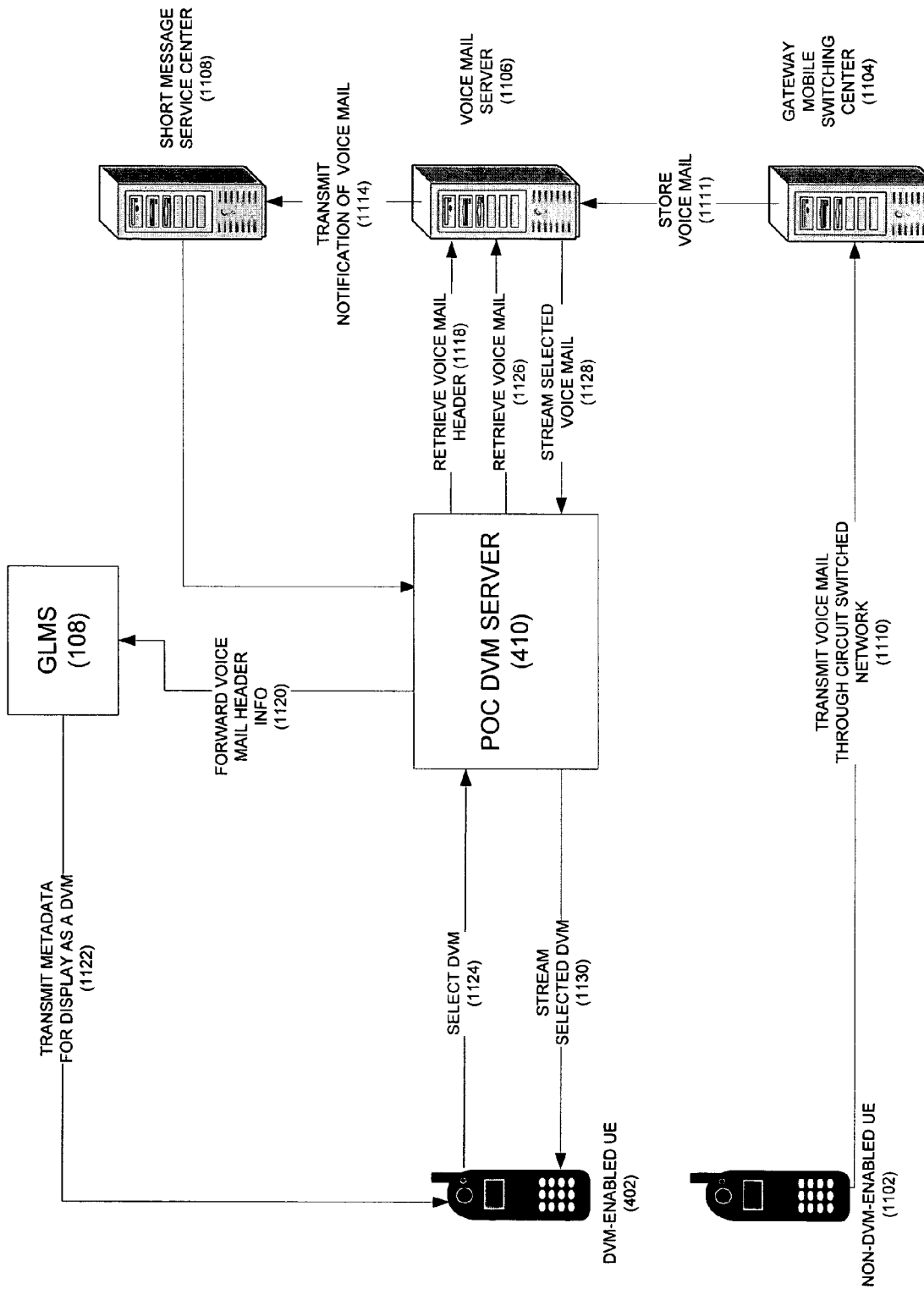
FIG. 11 shows a simplified diagram showing the transmission of a message from a non-DVM-enabled UE to a DVM-enabled UE, according to one embodiment of the invention.

Referring now to FIG. 11, a simplified diagram showing the transmission of a message from a non-DVM-enabled UE to a DVM-enabled UE, according to one embodiment of the invention. Initially, a voice mail sender transmits a voice mail to a voice mail recipient through a circuit switched network 1110 from non-DVM-enabled device 1102 to gateway mobile switching center 1104. Gateway mobile switching center 1104, in turn, stores voice mail 1111 at voice mail server 1106 (message store). A notification 1114 is then sent through short message service center 1108 to PoC DVM server 410.

Subsequently, PoC DVM server 410 retrieves voice mail header 1118 (including the date and time of transmission, recipient name, message length, etc.) from the transmitted voice mail stored at voice mail server 1106 (message store). PoC DVM server 410 forwards the voice mail header along with additional information, such as the DVM IDs 1120 (i.e. SIP URI) to GLMS 108. In addition, PoC DVM server 410 may also check the voice mail recipient's current personalization settings, such as appropriate delivery method, whether the voice mail recipient wishes to be disturbed (i.e., Do-Not-Disturb setting is set), whether the voice mail sender is on a black list, etc.

GLMS 108, in turn, converts voice mail header into DVM-compatible metadata and subsequently transmits this metadata for display as a received DVM on DVM-enabled UE 402. The voice mail recipient then selects the DVM 1124 by transmitting a request to PoC DVM server 410, which subsequently retrieves the voice mail 1126 from voice mail server 1106 (message store). The voice mail is then streamed as a DVM 1128 from voice mail server 1106 (message store), through PoC DVM server 410, and finally to DVM-enabled UE 402. In one embodiment, the voice mail can be cached in the media resource function of PoC DVM server 410, where it is available to be forwarded to other users by the voice mail recipient.

Advantages of the invention include methods of transmitting a message to a message server in a push-to-talk network. Additional advantages include a standards-based solution that combines the flexibility of mobile messaging with the ease-of-use of voice.

Having disclosed exemplary embodiments and the best mode, modifications and variations may be made to the disclosed embodiments while remaining within the subject and spirit of the invention as defined by the following claims.

APPENDIX

```xml
<?xml version="1.0" encoding="UTF-8"?>
    <xs:schema
        targetNamespace="urn:ietf:params:xml:ns:conference-info"
        xmlns:tns="urn:ietf:params:xml:ns:conference-info"
        xmlns:xs="http://www.w3.org/2001/XMLSchema"
        xmlns:di="urn:ietf:params:xml:ns:dialog-info"
        xmlns="urn:ietf:params:xml:ns:conference-info"
        elementFormDefault="qualified" attributeFormDefault="unqualified">
        <!-- This import brings in the XML language attribute xml:lang-->
        <xs:import namespace="http://www.w3.org/XML/1998/namespace"
            schemaLocation="http://www.w3.org/2001/03/xml.xsd"/>
        <!-- This import brings in the dialog-info element dialog-->
        <xs:import namespace="urn:ietf:params:xml:ns:dialog-info"
            schemaLocation="dialog-info.xsd"/>
        <xs:elementname="conference-info">
            <xs:complexType>
                <xs:sequence>
                    <xs:element name="conf-service" type="tns:conf-serviceType"
                        minOccurs="0" maxOccurs="unbounded"/>
                    <xs:element name="user" type="user-type"
                        minOccurs="0" maxOccurs="unbounded"/>
                    <xs:any namespace="##other" processContents="lax"
                        minOccurs="0" maxOccurs="unbounded"/>
                </xs:sequence>
                <xs:attribute name="version" type="xs:nonNegativeInteger"
                    use="required"/>
                <xs:attribute name="state" use="required">
                    <xs:simpleType>
                        <xs:restriction base="xs:string">
                            <xs:enumeration value="full"/>
                            <xs:enumeration value="partial"/>
                        </xs:restriction>
                    </xs:simpleType>
                </xs:attribute>
                <xs:attribute name="entity" type="xs:anyURI" use="required"/>
            </xs:complexType>
        </xs:element>
        <xs:complexType name="user-type">
            <xs:sequence>
                <xs:element name="status" type="tn:status-type" minOccurs="0"/>
                <xs:element ref="di:dialog" minOccurs="0"/>
                <xs:element name="media-streams" minOccurs="0">
                    <xs:complexType name="media-status-type">
                        <xs:sequence>
                            <xs:element name="media-stream"
                                type="tns:media-stream-type"
                                minOccurs="0" maxOccurs="unbounded"/>
                            <xs:any namespace="##other" processContents="lax"
                                minOccurs="0" maxOccurs="unbounded"/>
                        </xs:sequence>
                    </xs:complexType>
```

-continued

APPENDIX

```
            </xs:element>
        </xs:sequence>
        <xs:attribute name="uri" type="xs:anyURI" use="required"/>
        <xs:attribute name="sender-display-name" type="xs:string" use="optional"/>
                    <xs:attribute name="sent-time" type="xs:time" use="required"/>
        <xs:attribute ref="xml:lang" use="optional"/>
    </xs:complexType>
    <xs:complexType name="media-stream-type">
        <xs:simpleContent>
            <xs:extension base="xs:string">
                <xs:attribute name="media-type" type="tns:mimetypes"
                    use="required"/>
            </xs:extension>
        </xs:simpleContent>
    </xs:complexType>
    <xs:simpleType name="mimetypes">
        <xs:restriction base="xs:string">
            <xs:enumeration value="audio"/>
            <xs:enumeration value="video"/>
            <xs:enumeration value="message"/>
            <xs:enumeration value="application"/>
        </xs:restriction>
    </xs:simpleType>
    <xs:complexType name="conf-serviceType">
        <xs:simpleContent>
            <xs:extension base="xs:anyURI">
                <xs:attribute name="id" type="xs:string" use="required"/>
                <xs:attribute name="type" type="tns:typeType" use="required"/>
            </xs:extension>
        </xs:simpleContent>
    </xs:complexType>
    <xs:simpleType name="typeType">
        <xs:restriction base="xs:string">
            <xs:enumeration value="conf-policy"/>
            <xs:enumeration value="media-policy"/>
            <xs:enumeration value="floor-control"/>
        </xs:restriction>
    </xs:simpleType>
    <xs:simpleType name="status-type">
        <xs:restriction base="xs:string">
            <xs:enumeration value="unheared"/>
            <xs:enumeration value="heared"/>
        </xs:restriction>
    </xs:simpleType>
</xs:schema>
```

What is claimed is:

1. In a push-to-talk communications network, a method of transmitting a first message from a sending push-to-talk over cellular (PoC) client to a set of receiving PoC clients, comprising:

selecting said set of receiving PoC clients from a contact list on said sending PoC client, such that each of said receiving PoC clients has an address on said contact list;

transmitting said first message to a message server, wherein said sending PoC client is coupled to said message server, and wherein said message server is a DVM server;

storing said first message within said message server;

assigning said first message an identifier;

notifying said set of receiving PoC clients that said first message can be retrieved, wherein each of said set of receiving PoC clients is coupled to said message server, wherein a PTT-specific AdhocGroupRequest parameter in a SIP TO header of said message is replaced with a DVM specific SIP URI, wherein said DVM specific SIP URI is used as the value of said AdhocGroupRequest parameter by selecting a particular entry on a contact list by a sending PoC client user, and wherein a DVM specific SIP URI is added to said contact list via a back-end function.

2. The method of claim 1 further including the step of establishing a message session before the step of transmitting said first message to said message server.

3. The method of claim 2, wherein said sending PoC client requests said media connection by sending a SIP REFER using an existing SIP dialog of an established early session.

4. The method of claim 1, wherein said notification is displayed in a contact list on each of said set of receiving PoC clients.

5. The method of claim 1, wherein said notification is displayed as a member of a group contained within a contact list on each of said set of receiving PoC clients.

6. The method of claim 1, wherein said notification is displayed within an inbox on each of said set of receiving PoC clients.

7. The method of claim 6, wherein said notification can be added or deleted from said inbox using a group list management protocol.

8. The method of claim 6, wherein said inbox is an instant talk group on each of said set of receiving PoC clients.

9. The method of claim 6, wherein said entry on said inbox comprises a pointer to said first message on said message server.

10. The method of claim 1, wherein said notification is an entry on the said contact list associated with a SIP URI.

11. The method of claim 1, wherein said identifier is a SIP URI.

12. The method of claim 11, wherein said SIP URI includes a transaction priority field.

13. The method of claim 12, wherein said SIP URI includes a display placement field.

14. The method of claim 13, wherein said SIP URI includes a user licensing field.

15. The method of claim 1, wherein said sending PoC client and said set of receiving PoC clients are asynchronously coupled to said message server.

16. The method of claim 1, wherein said push-to-talk communications network is half-duplex.

17. The method of claim 1, wherein said message server is a message store.

18. The method of claim 17, wherein said message store is integrated into said push-to-talk communications network.

19. The method of claim 17, wherein said message store is external to said push-to-talk communications network.

20. The method of claim 1, where said first message is an ad-hoc instant personal direct voice message.

21. The method of claim 1, where said first message is an ad-hoc instant group direct voice message.

22. The method of claim 1, where said first message is an instant group direct voice message.

23. The method of claim 1, wherein said first message is a DVM message.

24. The method of claim 1, wherein said notification displays a name of a user associated with said sending PoC client.

25. The method of claim 1, wherein said notification displays a time said message was received at said message server.

26. The method of claim 1, wherein said notification displays a length of said message.

27. The method of claim 1, wherein said first message includes a SIP TO header.

28. The method of claim 1, wherein said first message includes a SIP REPLY TO header.

29. The method of claim 1, wherein said notification includes an alert.

30. The method of claim 29, wherein said alert is visual.

31. The method of claim 29, wherein said alert is audible.

32. The method of claim 1, wherein said first message can be deleted based on said notification.

33. The method of claim 32, wherein said first message can be retrieved based on said notification.

34. The method of claim 33, wherein a floor is automatically granted to said message server when said first message is retrieved.

35. The method of claim 1, wherein said sending PoC client further includes a message compose mode function.

36. The method of claim 35, wherein said compose mode function is separated from said contact list.

37. The method of claim 1, wherein a SIP URI of said first message may be associated with a display name of said sending PoC client.

38. The method of claim 37, wherein said display name is stored on a group and list management server.

39. The method of claim 1, wherein a date and a time when said message was transmitted can be displayed on each of said set of receiving PoC clients.

40. The method of claim 1, wherein a length of said message can be displayed on each of said set of receiving PoC clients.

41. The method of claim 1, wherein a push-to-talk session can be established between said message server and said sending PoC client.

42. The method of claim 41, wherein said push-to-talk session can be established using a SIP URI of said first message.

43. The method of claim 41, wherein said first message is associated with a named SIP URI of said sending PoC client, and a second message may be transmitted to said message server for said sending PoC client.

44. The method of claim 43, wherein said message session is terminated and a floor is released when said message has been transmitted to said message server.

45. The method of claim 1, wherein a sending PoC client user can control a maximum message length and a maximum message size of said message.

46. The method of claim 1, wherein said message is a contact in said contact list or a member of a group in said contact list.

47. The method of claim 1, wherein said sending PoC client can subscribe to a transmission status of said message by sending a SIP SUBSCRIBE request to said message server.

48. The method of claim 47, wherein said transmission status can be sent by said message server by sending back a SIP NOTIFY request.

49. The method of claim 1, wherein only said sending PoC client can disconnect from a message session.

50. The method of claim 1, wherein there is a no-sending restriction for transmitting an instant ad-hoc personal message.

51. The method of claim 1, wherein there is a black list restriction for transmitting an instant ad-hoc personal message.

52. The method of claim 1, wherein there is a no-sending device restriction for receiving an instant ad-hoc personal message.

53. The method of claim 1, wherein there is a black list restriction for receiving an instant ad-hoc personal message.

54. The method of claim 1, wherein only a message server box can receive said message.

55. The method of claim 1, wherein a DVM session can be terminated by said message server after a voice inactivity timer expiry.

56. The method of claim 1, wherein said sending PoC client registers with an IMS core with a DVMRequest feature tag in an accept-contact header.

57. The method of claim 56, wherein said DVMRequest feature tag comprises a +g.PoC.talkdvmburst tag.

58. The method of claim 1, wherein said sending PoC client adds a timer string to a SIP supported header in a SIP INVITE message.

59. The method of claim 1, wherein a content type application/vnd.PoC.dvm.refer-to is deployed for supporting an instant group and an ad-hoc group message.

60. The method of claim 59, wherein said push-to-talk communications network can discover a DVM service identifier as part of a recipient list as distributed across a Refer-To header and a set of body attributes.

61. The method of claim 1, wherein a free text string of message group member, sender display name and a URI are carried by deploying a content-type application/vnd.PoC.dvm.group-event+xml.

62. The method of claim 1, wherein after said sending PoC client sends an INVITE request, said message server sends a SIP 100 Trying response to said sending PoC client on behalf of any of said set of receiving PoC clients.

63. The method of claim 1, wherein a request-URI in SIP INVITE request is populated with a configurable parameter that indicates to said message server to create and return a transient ad-hoc message group identity in a SIP 200 response.

64. The method of claim 63, wherein said configurable parameter is a comp-ad-hocGroupDvmRequest.

65. The method of claim 1, wherein a request-URI in SIP INVITE request is populated with a global group identity of each of said set of receiving PoC clients.

66. The method of claim 1, wherein a request-URI in SIP INVITE request is populated with a configurable parameter retr-ad-hocGroupDvmRequest.

67. The method of claim 1, wherein a contact list can be used to select a receiving PoC client from said set of receiving PoC clients.

68. The method of claim 1, wherein a handset phone book can be used to select a receiving PoC client from said set of receiving PoC clients.

69. The method of claim 1, wherein a INVITE request can be sent with a message-adapted SIP URI to said message server acting for said set of receiving PoC clients when pressing a PTT button.

70. The method of claim 1, wherein a REFER request can be sent with a message-adapted SIP URI to a said message server acting for said set of receiving PoC clients when pressing a PTT button.

71. The method of claim 1, wherein said sending PoC client is notified when said message server starts to receive said message.

72. The method of claim 1, wherein said message server automatically ends a DVM session after said message is transmitted.

73. The method of claim 1, wherein said message server automatically ends a DVM session after a defined interval of inactivity.

74. The method of claim 1, wherein said sending PoC client transfers a push-to-talk session to said DVM session if said receiving PoC client is unavailable or if the Do-Not-Disturb setting is set.

75. The method of claim 1, wherein said each of set of receiving PoC clients is notified when said message server starts to receive said DVM.

76. The method of claim 1, wherein said message server has an interface to an external message store.

77. The method of claim 76, wherein said interface is a MMSC.

78. The method of claim 76, wherein said interface is a CS Voice Mail server.

79. The method of claim 76, wherein said DVM is transcoded when transmitted to said external message store.

80. The method of claim 1, wherein said message server screens a DVM session request to ensure if said DVM can be transmitted.

81. The method of claim 1, wherein each of said set of receiving PoC clients can convert a DVM session into a said push-to-talk session.

82. The method of claim 1, wherein said first message is placed in said sending PoC client sent folder for later playback along with a reply.

83. The method of claim 1, wherein said sending PoC client can fallback to said DVM session in case of failure to establish a PTT session to said receiving PoC clients.

84. The method of claim 1, said sending PoC client is coupled to said message server in an internet protocol network.

85. The method of claim 1, wherein each of said set of receiving PoC clients is coupled to said message server in an internet protocol network.

86. In a push-to-talk communications network, a method of asynchronously transmitting a first message from a sending push-to-talk over cellular (PoC) client to a set of receiving PoC clients, comprising:

selecting said set of receiving PoC clients from a contact list on said sending PoC client, such that each of said receiving PoC clients has an unique address on said contact list;

establishing a message session before the step of transmitting said first message to a message server, wherein said message server is a DVM server;

transmitting said first message to a said message server, wherein said sending PoC client is coupled to said message server in an internet protocol network;

storing said first message within said message server;

assigning said message an unique identifier;

notifying said set of receiving PoC clients that said first message can be retrieved, wherein each of said set of receiving PoC clients is asynchronously coupled to said message server in an internet protocol network, wherein a PTT-specific AdhocGroupRequest parameter in a SIP TO header of said message is replaced with a DVM specific SIP URI, wherein said DVM specific SIP URI is used as the value of said AdhocGroupRequest parameter by selecting a particular entry on a contact list by a sending PoC client user, and wherein a DVM specific SIP URI is added to said contact list via a back-end function.

87. In a push-to-talk communications network, a method of asynchronously transmitting a first message from a sending push-to-talk over cellular (PoC) client to a set of receiving PoC clients, comprising:

selecting said set of receiving PoC clients from a contact list on said sending PoC client, such that each of said receiving PoC clients has an unique address on said contact list;

establishing a message session before the step of transmitting said first message to a DVM server;

transmitting said first message to the DVM server, wherein said sending PoC client is coupled to the DVM server in an GSM/GPRS network;

storing said first message within the DVM server;

assigning said message an unique identifier;

notifying said set of receiving PoC clients that said first message can be retrieved, wherein each of said set of receiving PoC clients is asynchronously coupled to the DVM server in a GSM/GPRS network, wherein a PTT-specific AdhocGroupRequest parameter in a SIP TO header of said message is replaced with a DVM specific SIP URI, wherein said DVM specific SIP URI is used as the value of said AdhocGroupRequest parameter by selecting a particular entry on a contact list by a sending PoC client user, and wherein a DVM specific SIP URI is added to said contact list via a back-end function.

* * * * *